Sept. 18, 1928.    1,684,830
G. F. HEFFELBOWER
SAFETY RAZOR BLADE HOLDER
Filed Sept. 10, 1925
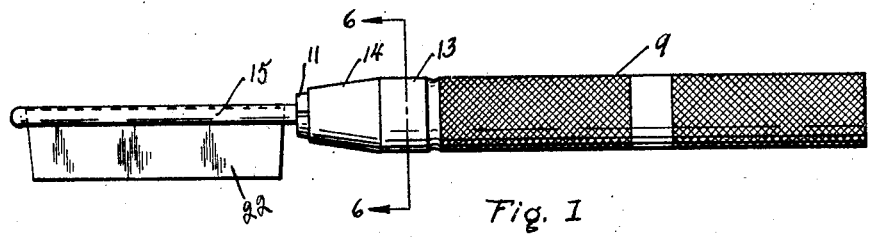
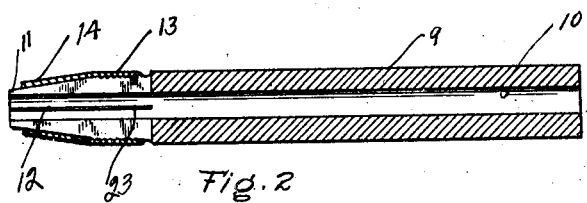
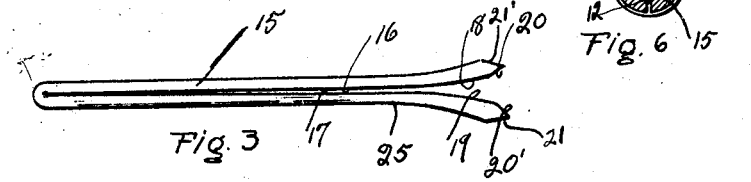
INVENTOR.
George F. Heffelbower
BY
Thos. J. Donnelly
ATTORNEY Patented Sept. 18, 1928.

1,684,830

UNITED STATES PATENT OFFICE.

GEORGE F. HEFFELBOWER, OF FLINT, MICHIGAN.

SAFETY-RAZOR-BLADE HOLDER.

Application filed September 10, 1925. Serial No. 55,449.

My invention relates to a new and useful improvement in a safety razor blade holder and has for its object the provision of a device of this class which will be simple in structure, economical of manufacture and highly efficient in use.

Another object of the invention is the provision of a safety razor blade holder having blade holding means adapted for engaging the blade at opposite ends thereof.

Another object of the invention is the provision of a safety razor blade holder, of an operating handle having a bore formed therein adapted for receiving the holding member when not in use.

Another object of the invention is the provision of a bifurcated holding member adapted for insertion in a chuck and provided with means for preventing the rotation of the holder while in operative position in the chuck.

Other objects will appear hereinafter.

The invention consists in the combinations and arrangements of parts hereinafter described and claimed.

The invention will be best understood from a reference to the accompanying drawings which form a part of this specification and in which, Fig. 1 is a side elevational view of the invention, Fig. 2 is a longitudinal central vertical sectional view of the handle used in the invention, Fig. 3 is an elevational view of the holder used in the invention, Fig. 4 is a plan view of the locking plate used in the invention, Fig. 5 is a perspective view of a guard adapted for use with the invention, Fig. 6 is a sectional view taken on substantially line 6—6 of Fig. 1.

The invention is adapted primarily for holding a safety razor blade during a honing or stropping of the same. In its preferred form, it comprises a handle 9, having a bore 10 formed therein. The handle 9 is provided, at one end, with a reduced portion 11, having a plurality of longitudinally extending slits 12 formed therein, to provide a spring chuck on this end of the handle. A locking sleeve 13 is adapted for threading on the holding end of the handle, and provided with a tapered portion 14 adapted to engage the taper of the reduced portion 11 for bringing the member into binding engagement with the holding member when inserted therein, a threading of the sleeve 13 upon the handle serving to compress the slitted portion 11 of the handle to effect a clamping. The holder comprises a bifurcated member 15, having its doubled-over portions provided with interior slightly arcuate or curved surfaces 16 and 17. The ends of these members are flared outwardly to provide the separated surfaces 18 and 19 which terminate in a bevel respectively 20 and 20'. The outer surfaces of these bifurcations are also beveled, as at 21 and 21'. The bevel on the inner surface is to permit a ready passage of the blade 22 between these members and the bevel on the outer surface is to permit a ready insertion of the holder in the bore of the chuck.

A locking plate 23 is adapted for insertion into a pair of aligned slits so that this locking plate extends diametrically across the bore 10 in the chuck.

In operation, a blade is inserted between the bifurcations of the member 15. The curve on the inner surfaces of these members thereby causes a clamping of the plate, at its inner end, the blade being free from engagement with the remainder of the bifurcations. After the blade is positioned in the holder, the loose ends of the holding member are inserted into the chuck which causes a compressing of the same relatively to each other, so as to bring them into engagement with the blade 22, adjacent its opposite end, the blade between the two points of contact described being substantially free from engagement with the holding member. The sleeve is then threaded into place, this sleeve having been placed on the handle loosely previous to insertion of the holding member into the chuck. The plate 23 engages between the bifurcations so as to prevent a turning of the same while the holder is held in the handle. The sleeve 13 is then threaded tightly onto the handle, so as to bring the slit portions of the portion 11 tightly in engagement with the member 15. In this way, the blade is securely clamped, at opposite ends, and prevented from turning in honing or stropping. In case it is desired to use the holder with a double-edged blade, the doubled over metallic guard 24 may be placed upon the edge which is not being honed or stropped.

With a razor blade holder of this class, the same may be used with safety to the operator for stropping and honing and the construction of the holder is such that a razor blade may be honed on a flat surface and stropped either on a rigid or a flexible strop. When the device is not in use, the blade holder may be removed and placed in the bore of the handle so that it may be easily carried in the vest pocket of a person, if desired. It will be noted that the holder 15 is not provided with an eye but otherwise resembles very closely an ordinary cotter pin, which makes this device cheaply and easily constructed. The curving of the bars of the holder outwardly with a substantially uniform curve throughout their length presents the inner surfaces, which are flat, in the most advantageous form to grasp the ends of the blade when the holder is inserted into the chuck. The normal hole of the chuck is of less diameter than the diameter determined by the thickness of the bifurcations and the blade inserted between them so that, as the sleeve 13 is threaded onto the handle, a tight clamping of the blade takes effect, bringing the clamping of the holder at the separate ends of the blade. This affords a clamping at the separate ends effected by a leverage which has great power and strength.

The locking plate is inserted in the slits, as described, with a drive fit so that it is permanently mounted therein once assembled. This locking member assures a rigid assembly of the locking bars, or bifurcations, and diminishes to the maximum all lost motion in the device when it is turned from side to side in stropping or honing the blade in different directions.

It is to be noted that a slight amount is cut away from the inner surfaces of each of the bifurcations, as at 25. It is at this point that the chuck engages these bifurcations to clamp them together so that the point of engagement of the chuck with the bifurcations is at the thinnest portion and any longitudinal movement of this holding member is thereby prevented.

While I have illustrated and described the preferred form of my invention, I do not wish to limit myself to the precise form of structure shown but desire to avail myself of such variations and modifications as come within the scope of the appended claims.

Having thus described my invention, what I claim as new and desire to secure by Letters Patent is:

1. A safety razor blade holder having a bore formed therein and provided, adjacent one end, with a plurality of slits to form a spring chuck; a locking member mounted in a pair of diametrically opposite slits and extending across said bore; and a blade holder, comprising a pair of doubled-over members adapted for insertion into said slitted end and for straddling said locking member; and means for clamping said slitted end into engagement with said holder.

2. A safety razor blade holder comprising: a handle having a bore formed therein, said handle being tapered at one end, the tapered end of said handle being provided with diametrically opposite slits in a pair of planes at right angles to each other; a separable plate positioned in a pair of said diametrically opposite slits, said plate terminating on its opposite ends flush with the periphery of said handle; a locking member comprising a piece of resilient material doubled upon itself, the doubled over ends being flared outwardly and adapted upon compression inwardly toward each other for insertion into said bore on the slitted ends thereof; a sleeve threaded on said slitted end for compressing said bore into engaging relation with said holder, said holder being adapted for the insertion between its doubled over portion of a safety razor blade, said holder upon insertion of said bore straddling said separable plate.

In testimony whereof, I have signed the foregoing specification.

GEORGE F. HEFFELBOWER.